April 4, 1961 E. B. POOL 2,978,221
RESILIENTLY SEATED VALVES AND SEALING STRUCTURES THEREFOR
Filed June 26, 1959 2 Sheets-Sheet 1

INVENTOR
ELDERT B. POOL

BY Strauch, Nolan + Neale

ATTORNEYS

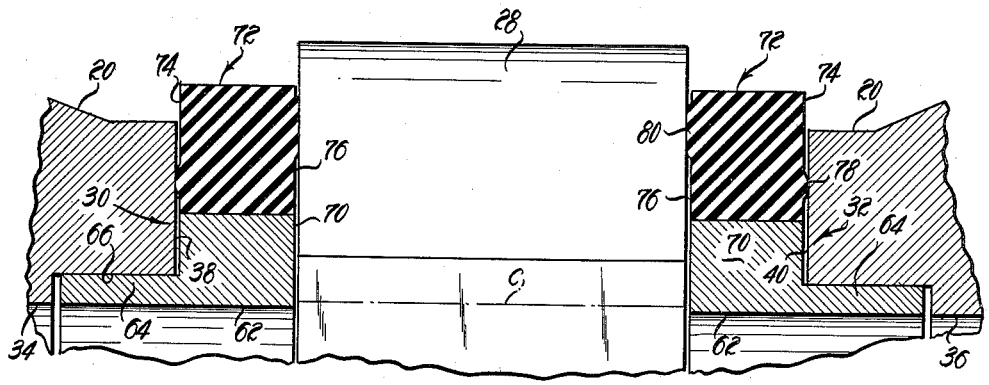
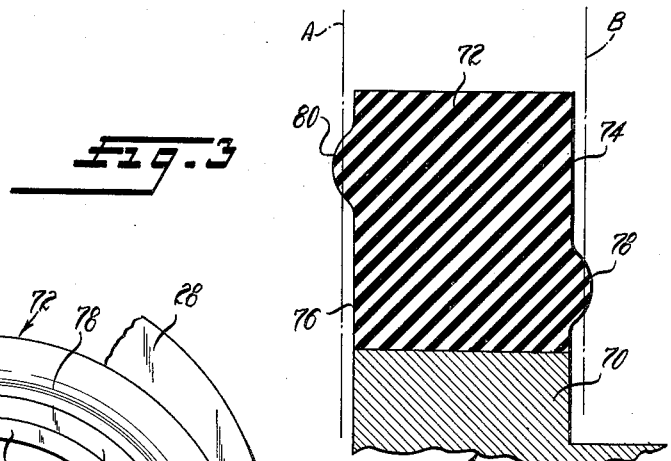
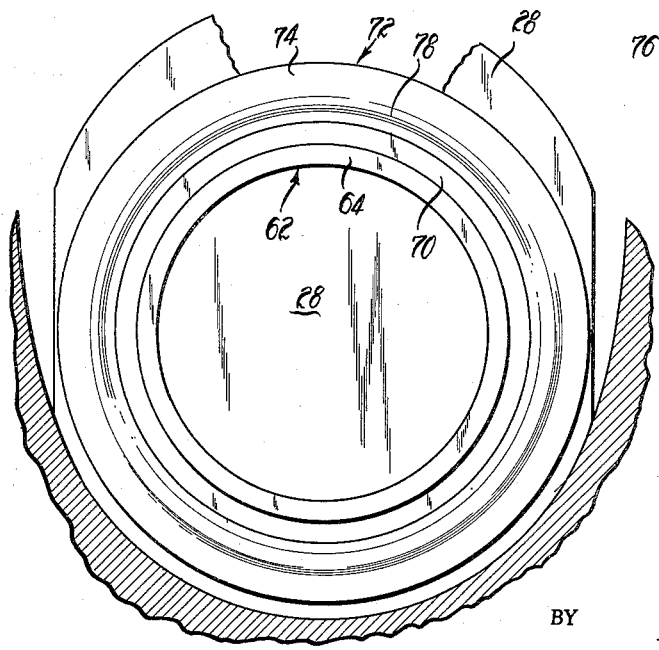

United States Patent Office 2,978,221
Patented Apr. 4, 1961

2,978,221

RESILIENTLY SEATED VALVES AND SEALING STRUCTURES THEREFOR

Eldert B. Pool, Palos Heights, Ill., assignor to Edward Valves, Inc., East Chicago, Ind., a corporation of Delaware Filed June 26, 1959, Ser. No. 823,230

6 Claims. (Cl. 251—172)

This invention relates to valves and more particularly to gate valves and novel resilient sealing structures for such valves.

Valves of the type with which the present invention is primarily concerned are especially adapted for controlling the flow of abrasive laden fluids at relatively high pressures. In a typical case the valves of the present invention will be used to control the flow of "mud" used in oil well drilling operations which is circulated at pressures ranging as high as 5000 p.s.i.

For service of this type, valves must meet a number of exacting requirements. For example, they must provide a drop-tight seal under varying conditions despite the presence of abrasive particles on the sealing surfaces. They must provide a drop-tight seal at low pressures as well as high pressures. They must be easily repairable in the field and must have a reasonable service life despite unskilled or abusive treatment in the field. In addition such valves must be of relatively simple construction to permit their manufacture and sale at a competitive price.

It is the principal purpose and object of the present invention to provide improved valves satisfying these requirements and the other requirements of mudline service and similar service.

In view of the widespread use of valves of this general type, many attempts have been made in the past to provide resilient seated valves meeting the above stated service requirements. One such prior proposal which has never been put into commercial use is disclosed in U.S. Patent 2,606,740. While the structure disclosed in this patent is relatively simple and is relatively easy to operate, nevertheless its performance is dependent upon factors extrinsic to the valve itself, for example, the pressure and characteristics of the line fluid.

The valve of the present invention includes novel resilient sealing structure which provides a drop-tight seal regardless of the nature of the fluid passing through the valve and regardless of the pressure differential across the valve seals.

In accordance with the subject invention, the sealing structure includes a resilient sealing ring bonded to the outer periphery of a metal back-up ring surrounding the valve flow passage at each side of the gate. Each resilient sealing ring is provided with annular ridges which engage the adjacent annular surfaces of the valve gate and body respectively. The valve gate, the resilient rings and their ridges and the adjacent body surfaces are so arranged that when the parts are assembled initially the ridges will be deformed to establish an initial low pressure seal. As the pressure to be contained is raised, this initial mechanically established seal forms a dam across which a differential pressure of increasing value is established. This differential pressure is utilized to augment the sealing pressure to thereby establish a seal which cannot be broken in the absence of structural failure of the valve.

It is thus also an object of the present invention to provide an improved valve having these further performance characteristics.

Additional objects and advantages will become apparent as the description proceeds in connection with the accompanying drawings in which:

Figure 2 is an enlarged portion of a section of Figure 1;

Figure 3 is an enlarged fragmentary section of a portion of the sealing structure removed from the valve; and Figure 4 is a transverse section of the valve taken along line 4—4 of Figure 1.

Figure 1:
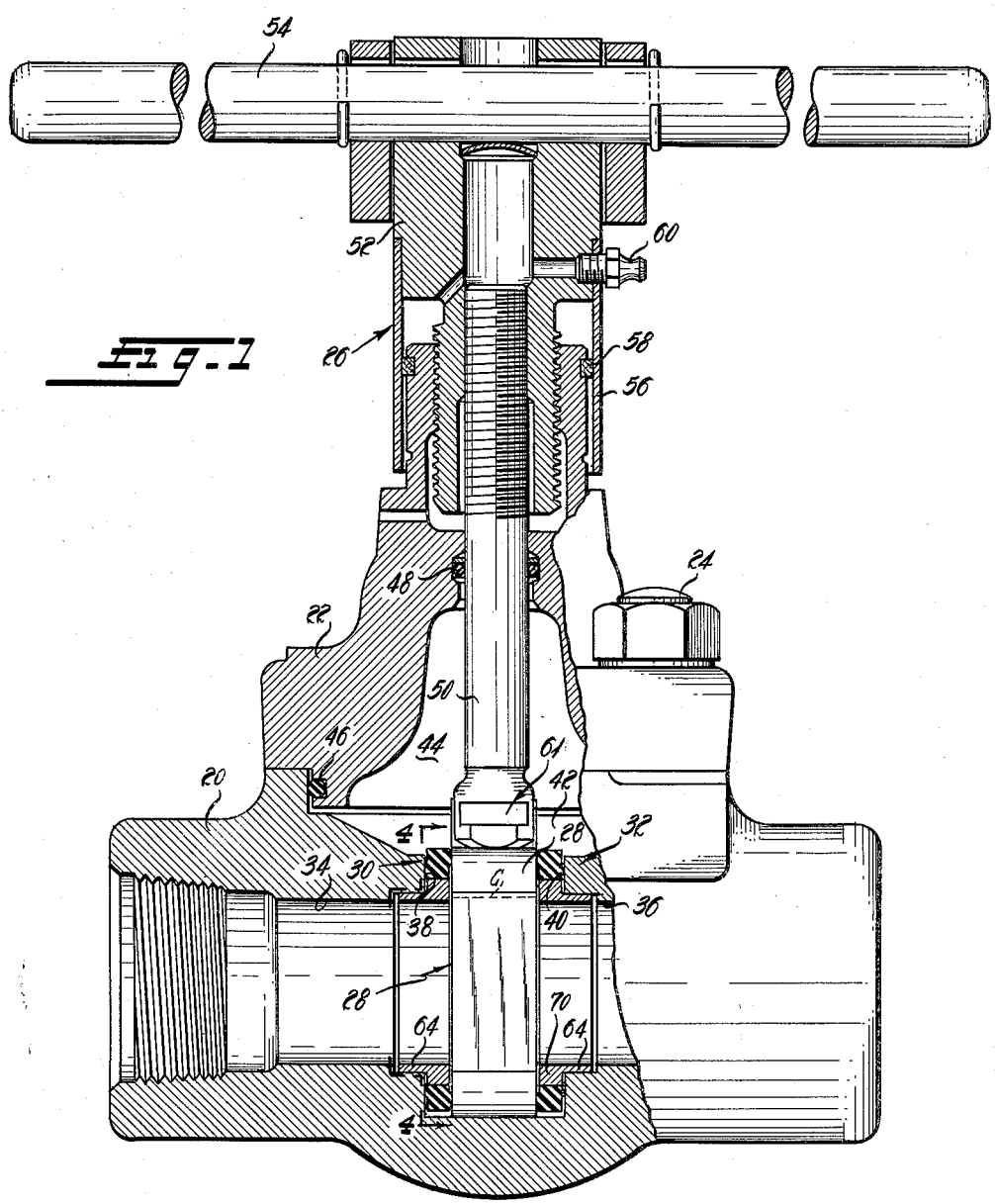
Figure 1 is a central vertical elevation of a valve constructed in accordance with the present invention with parts in elevation.

The principal components of the valve shown in Figure 1 are the valve body 20, the bonnet 22 secured to the body by four bolts 24 (one shown), the valve stem operating mechanism indicated generally at 26, the valve gate 28 and the valve sealing assemblies indicated generally at 30 and 32. The valve body 20 is provided with a pair of spaced aligned flow passages 34 and 36 which terminate at their inner ends in parallel annular surfaces 38 and 40, respectively, which are normal to the axis of the flow passages 34 and 36. The parallel faces 38 and 40 form the sides of an upwardly opening cavity 42 into which the valve gate 28 extends when the valve is closed. The cavity 42 communicates with a cavity 44 formed in the lower surface of the bonnet 22, this cavity being sealed by O-rings 46 and 48, the latter surrounding the stem 50.

A valve stem operator 52 is provided with a set of internal threads engaging threads on the upper end of the stem and a set of external threads threaded into the upper end of the valve bonnet. The external and internal threads on the valve operator 52 are of opposite hand. When the external and internal threads of the operator 52 are of the same pitch, the stem moves axially at double the rate and distance of axial movement of the operator 52 which decreases the number of turns of the handwheel assembly 54 which is secured to the operator 52 and facilitates quick and full operation of the valve. The stem operator assembly 26 is completed by a shield 56 and a seal 58 which protect the operating mechanism and form a lubricant passage to which lubricant is supplied through a conventional fitting 60.

The valve gate 28 is connected to the lower end of the stem 50 by a sliding T-slot arrangement 61 to permit free movement of the gate axially of the flow passages, to avoid the establishment of bending moments in the stem and to facilitate the sealing action of the valve as described below.

The sealing ring structures 30 and 32 which form an important part of the present invention are of identical construction. Each of these composite sealing structures includes a metal back-up ring 62 of L-shaped cross-section, one leg 64 of which forms an axial extension of the back-up ring and is received with a snug fit in counterbores 66 or 68 formed in the inner ends of the flow passages 34 and 36 respectively. The other leg 70 of the back-up ring forms a radial extension which is received between the planar faces 38 and 40 of the valve body and the side surfaces of the gate 28.

Bonded to the outer cylindrical periphery of the section 70 of the metal back-up ring 62 is a resilient sealing ring 72. Preferably the ring 72 is molded from a synthetic rubber material and preferably has a hardness in neighborhood of 70 durometer. The ring 72 is essentially rectangular in cross-section and has cylindrical inner and outer surfaces concentric with the axis of the flow passages 34 and 36. The parallel side faces 74 and 76 of the seal rings are substantially normal to the axis of the flow passages 34 and 36 and are substantially flush with the corresponding radially extending surfaces of the section 70 of the back-up ring 62.

Formed integrally with the outer face 74 of the resilient ring 72 is an annular ridge 78 which in the absence of pressure projects outwardly from the face 74 in a direction axially of the valve flow passages 34 and 36. While the location of the ridge 78 may be varied to some extent, it is preferably positioned inwardly of the radial midpoint of the surface 74. A second annular ridge 80 is formed on the inner side of the resilient ring 72 and in the absence of pressure projects axially of the flow passages 34 and 36 from the inner radial face 76 of the sealing ring.

When the composite sealing unit is removed from the valve body, it appears substantially as shown in Figure 3. The width of the sealing rings including the ridges is greater than the spacing between the adjacent surfaces of the gate and the body between which the ring is positioned in use. For convenience the width of the rings in the absence of fluid or mechanical pressure may be termed "free width." When the unit is installed in the valve body, the ridges 78 and 80 on the resilient sealing rings at both sides of the gate are deflected slightly to the extent indicated by the reference lines A and B in Figure 3 which indicate the relative positions of the side surface of the gate 28 and the radial body face 38 or 40 when the gate is lowered in the closed position as shown in Figure 1 and the entire valve structure is exposed to atmospheric pressure. Because of the T-slot connection 61 between the gate 28 and the stem 50, the gate will be substantially centered under these conditions as shown in Figure 2. By varying the width of the main body portion of the sealing ring 72 or the height of the ridges 78 and 80 or by varying the thickness of the gate or the spacing between the radial body surfaces 38 and 40, the amount of deflection of the ridges 78 and 80 and accordingly the contact pressure between these ridges and the adjacent metal parts can be varied within wide limits. In practice, the parts are so dimensioned that the resilient seals are capable of sealing against a differential pressure of from 25 to 50 p.s.i. applied radially outwardly of the seal rings. While this value is not critical, nevertheless if it is substantially lower than 25 p.s.i. it might adversely affect the ability of the seal to provide a drop-tight closure at low line pressures. On the other hand, if it is substantially above 50 p.s.i., the torque required to operate the valve tends to become objectionably high.

The operation of the valve will now be described assuming that the valve is initially in the closed position as shown in Figure 1, that the bonnet cavity and the lines are empty and that one side of the valve is connected to atmospheric pressure and the opposite side is then connected to a source of fluid under relatively high pressures, for example 2000 p.s.i. Since the valve and the sealing structures are completely symmetrical, either side of the valve may be connected to the source of high pressure. For purposes of illustration, let it be assumed that the flow passage 34 is the inlet passage which is connected to the source of fluid under pressure and the flow passage 36 is the outlet passage connected to atmospheric pressure. Immediately on the application of pressure through the passage 34, the gate moves in a downstream direction, that is toward the right as viewed in Figures 1 and 2. This movement continues until the outer radial surface of the leg 70 of the metal back-up ring 62 is in full surface contact with the surface 40 of the valve body and the downstream surface of the gate is in surface contact with the inner radial edge of the back-up ring 62. This downstream movement of the gate further deflects the ridges 78 and 80 on the downstream ring and these ridges ultimately disappear into the main body of the ring. When the gate has reached its limit position, it is supported against further movement by solid metal-to-metal contact of the parts.

When the applied pressure reaches a value of from 25 to 50 p.s.i., the seal at the upstream side of the valve is broken permitting a small amount of fluid to leak past the upstream seal ring to fill and pressurize the bonnet cavity. This slight leakage continues until substantially full line pressure is established in the bonnet cavity and this pressure is applied to the entire outer circumferential surface of the downstream sealing ring 72 to urge this ring into sealing contact with the adjacent gate and body surfaces. Since the downstream sealing ring is fully supported against radially inward movement, there is no possibility of damage to the downstream resilient sealing ring regardless of the size of the differential pressure which is applied across it.

If, under these same operating conditions, the valve gate is moved upwardly toward open position, an increasing area of the lower portion of the downstream sealing ring 72 is exposed to upstream fluid pressure. Since the movement of the gate across the downstream sealing ring is effected by pure sliding action, the downstream sealing ring has no tendency to follow the gate. Depending upon the viscosity and other characteristics of the fluid and the quality of the finish on the surfaces of the gate and the adjacent portions of the metal back-up ring 62, a limited amount of fluid may begin to flow through the valve when the lower edge of the gate reaches the level of the outer circumference of the section 70 of the back-up ring. As the gate is raised further, fluid will flow through the valve at an increasing rate and when the gate is fully raised so that its lower edge is substantially flush with the inner surface of the top portion of the metal back-up rings 62 as shown by reference line C fluid flow through the valve is substantially unimpeded. It is to be particularly noted that at no time during the opening or closing action of the valve is the rubber at the downstream sealing ring unsupported against downstream movement while a substantial fluid pressure differential is applied across it. Accordingly, there is no possibility of damage to the resilient sealing elements during either opening or closing action of the valve.

When the gate is fully opened, it continues to hold the composite sealing ring structures firmly in place. If, for any reason, it becomes necessary to replace either of the sealing elements, the nuts and the four bolts 24 are removed and the entire bonnet carrying the stem and gate is lifted off the main valve body and either or both of the sealing ring structures may be moved and replaced easily without the utilization of special tools or techniques. Also it is to be particularly noted that the valve sealing elements can be replaced without breaking the line on which the valve body is installed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A gate valve comprising a valve body having inlet and outlet flow passages communicating at their inner ends with an enlarged upwardly opening cavity, the inner end of said outlet flow passage being formed by a planar surface surrounding said outlet flow passage, means providing a seat at the inner end of said inlet flow passage, a bonnet detachably secured to said body to close said cavity, a stem mounted on said bonnet for reciprocating movement toward and away from said cavity, a gate mounted on the lower end of said stem for movement into and out of said cavity and for movement axially of said flow passages, a composite sealing insert adapted to be removably mounted in said cavity comprising a resilient sealing ring surrounding the inner end of said outlet flow passage, an annular ridge on one radial face of said sealing ring adapted to engage said planar body surface, a second annular ridge on the opposite radial face of said sealing ring engageable with the adjacent side surface of said gate, the free width of said sealing ring including said sealing ridges being greater than the space between the side surface of said gate and the adjacent planar body surface when the opposite side surface of said gate engages said seat whereby said ridges are initially deflected by said gate and said planar body surface, a metal reinforcing ring bonded to the inner periphery of said sealing ring, said reinforcing ring having a radial surface engageable with said planar body surface and having another radial surface engageable with the adjacent side surface of said gate, the spacing between said radial surfaces being less than said free width of said sealing ring, whereby when said gate is moved to closed position said gate is moved in a downstream direction by line pressure against the adjacent reinforcing ring and the ridges of the sealing ring are further deflected between the adjacent body and gate surfaces.

2. The gate valve according to claim 1 together with retaining means on said reinforcing ring engageable with said body to prevent movement of said insert out of said cavity when said gate is in closed position.

3. A gate valve comprising a valve body having inlet and outlet flow passages communicating at their inner ends with an enlarged upwardly opening cavity, the inner ends of said passages being formed by parallel spaced planar surfaces surrounding said passages, a bonnet detachably secured to said body to close said cavity, a stem mounted on said bonnet for reciprocating movement toward and away from said cavity, a gate mounted on the lower end of said stem for movement into and out of said cavity and for movement axially of said flow passages, sealing inserts adapted to be removably mounted in said cavity comprising a pair of spaced sealing rings surrounding the respective inner ends of said flow passages, an annular ridge on each sealing ring projecting axially of said flow passages from the outer radial face of said rings and adapted to engage said spaced planar body surfaces, a second annular ridge on each sealing ring projecting axially from the inner radial face thereof and engageable with the side surfaces of said gate, the free width of said sealing rings including said ridges being greater than the space between the respective side surfaces of said gate and the adjacent planar body surfaces, whereby said ridges are initially deflected by said gate and said planar body surfaces, metal reinforcing rings bonded to the inner periphery of each of said sealing rings, said reinforcing rings having outer radial surfaces engageable with said planar body surfaces and having inner radial surfaces engageable with the respective upstream and downstream side surfaces of said gate, the spacing between said radial surfaces being less than said free width of said sealing rings whereby when said gate is moved to closed position said gate is moved in a downstream direction by line pressure against the adjacent one of said reinforcing rings and the ridges of the sealing ring at the downstream side of said gate are further deflected by the adjacent body and gate surfaces.

4. The gate valve according to claim 3 together with retainers on said reinforcing rings engageable with said body to prevent movement of said inserts out of said cavity when said gate is in open position.

5. The gate valve according to claim 3 together with retaining means on said reinforcing rings engageable with said body to prevent movement of said inserts out of said cavity when said gate is in closed position.

6. The valve according to claim 3 wherein the ridges on said sealing rings in engagement with said gate are formed on a diameter substantially greater than the diameter on which the ridges engaging said body surfaces are formed.

References Cited in the file of this patent

UNITED STATES PATENTS 2,606,740     Allen _____ Aug. 12, 1952

FOREIGN PATENTS 749,932     Great Britain _____ June 6, 1956